Patented Nov. 15, 1949

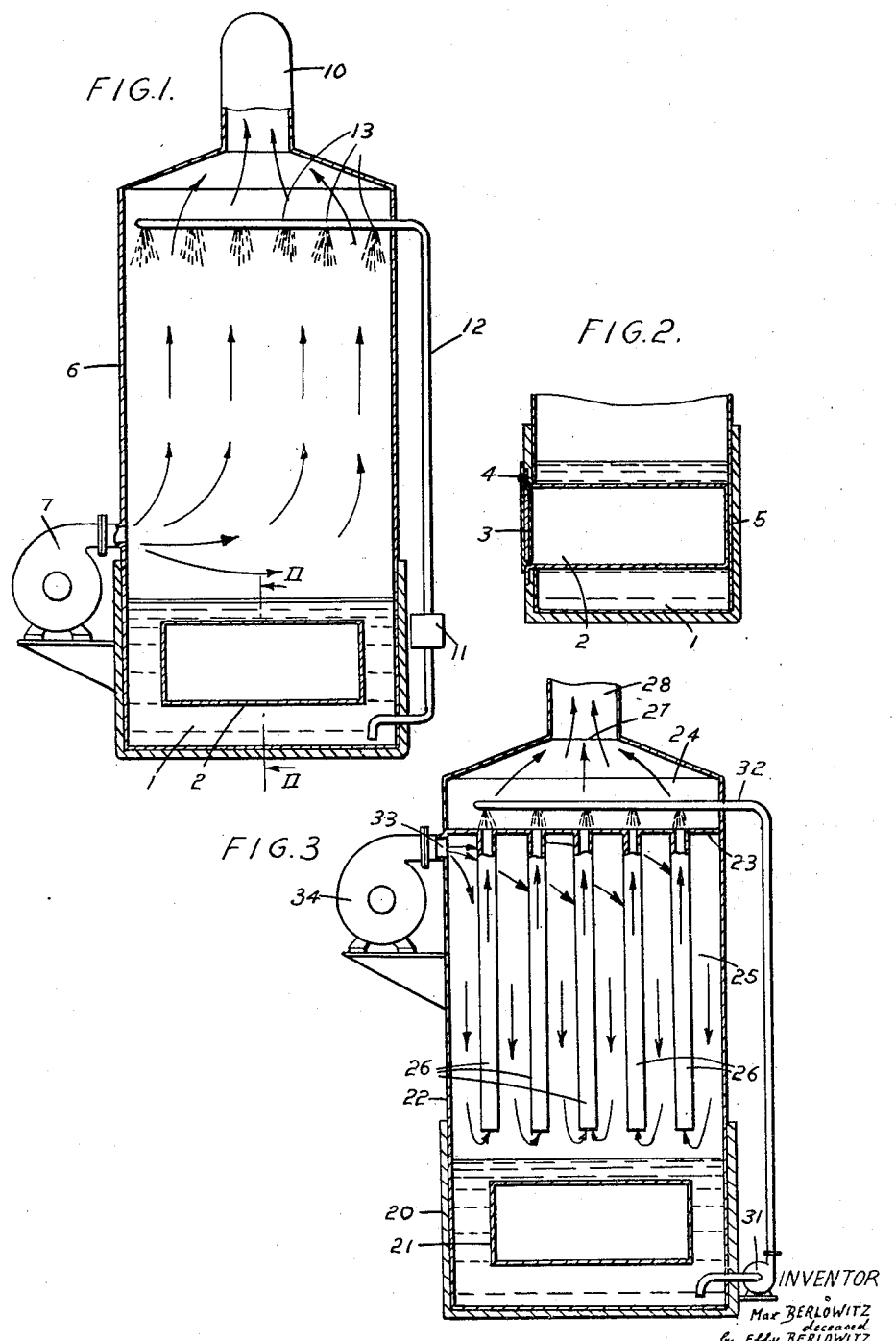

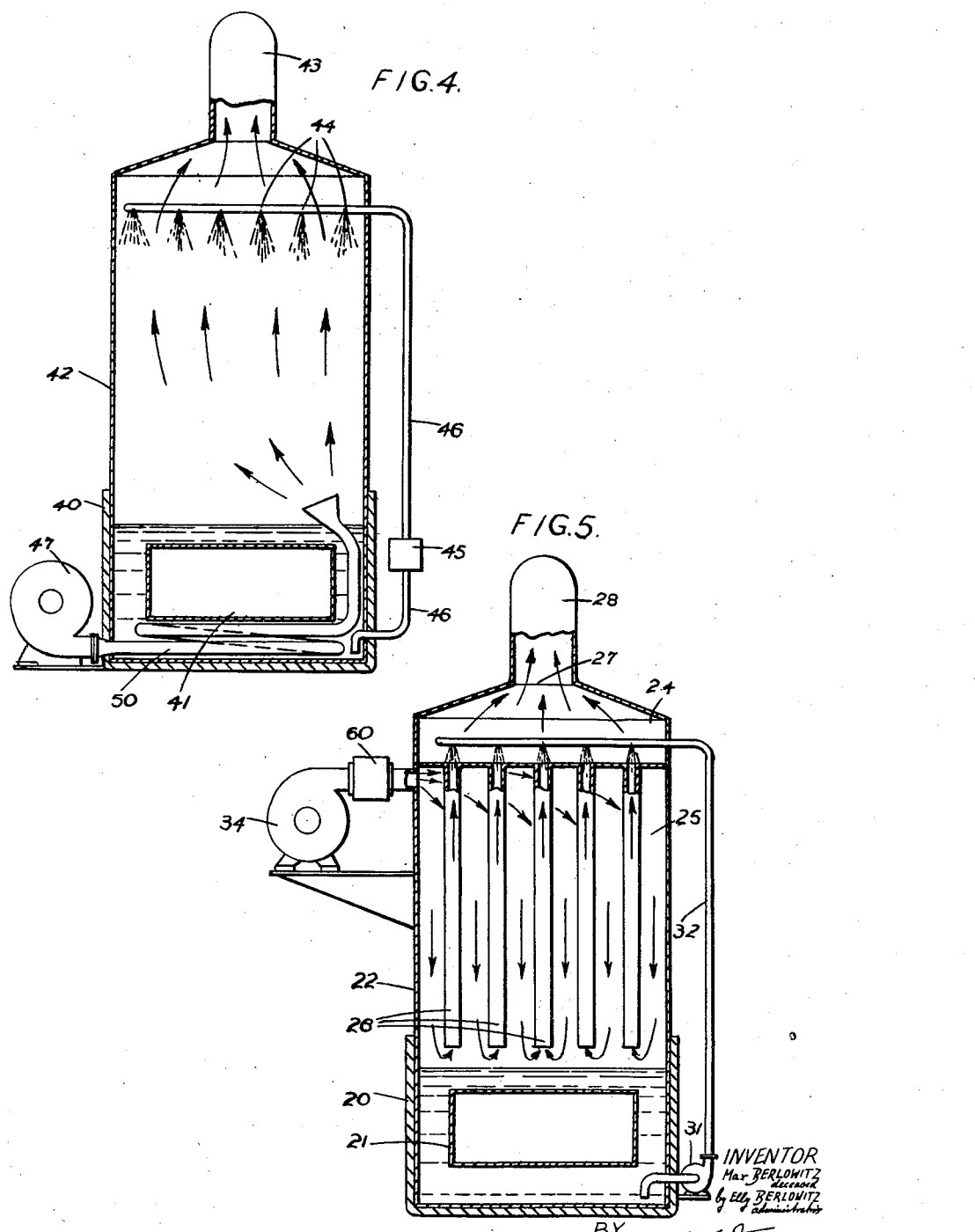

2,488,116

UNITED STATES PATENT OFFICE 2,488,116

REFRIGERATOR CHAMBER COOLED BY EVAPORIZATION OF LIQUID BY A CURRENT OF AIR

Max Berlowitz, deceased, late of London, England, by Elly Berlowitz, administratrix, London, England Application October 23, 1945, Serial No. 624,047
In Great Britain October 27, 1944

8 Claims. (Cl. 62—90)

The present invention relates to means for cooling food stuff and the like, particularly for household purposes.

It is an object of the invention to provide such means which are simple and inexpensive.

It is another object of the invention to provide such cooling means which do not need any refrigerant the initial temperature of which is at or below freezing point.

Other objects and advantages of the invention will become apparent to those skilled in the art from the following description when read in conjunction with the appended somewhat diagrammatical drawings, in which Fig. 1 shows a first embodiment of the invention in section;

Fig. 2 is a section along the line II—II of Fig. 1;

Fig. 3 shows a second embodiment of the invention;

Fig. 4 shows a first modification of the embodiment of Fig. 3; and

Fig. 5 shows a second modification of the embodiment of Fig. 3.

Referring first to Figs. 1 and 2, the embodiment illustrated comprises a heat insulated tank 1 for an evaporative liquid, for example water. The tank 1 is partitioned to form a container 2 therein for receiving the food stuff or the like to be cooled. The container 2 is accessible from the outside of the tank 1 by a heat insulated door 3 which is hinged at 4 to the tank 1. The container 2 is supported in the tank at 5. Except for the door 3, the walls of the container 2 are made of a material of high heat conductivity. The tank 1 is arranged to form the lower part of a casing 6. A current of a gaseous medium, for example, air may be created in the casing 6 by means of a fan or the like 7, the air or the like current leaving the casing 6 through a conduit 10. A pump 11 is provided for circulating liquid from the tank 1, through a pipe 12, jets 13, through the gas current in counter-flow thereto, and back to the tank 1.

In operation, the liquid in the tank 1 surrounds, partly or completely, the container 2 and the circulating liquid comes into intimate contact with the gas current within the casing 6. The liquid is in part evaporated and thereby cooled and cools, on its return into the tank 1, the liquid therein, whereby the food stuff or the like in the container 2 is cooled.

With such a simple arrangement, the liquid in the tank 1, and thereby the food stuff and the like may be cooled down to approximately the wet bulb temperature of the gas.

If it is desired to reach a still lower temperature which lies only a few degrees above the dew point of the air or other gas, according to an important feature of the invention, means are provided for pre-cooling the incoming gas current, before it comes into contact with the circulating liquid, by heat exchange either with the cooled liquid, and/or with the outgoing gas current which has been cooled by evaporation of the liquid to approximately the same temperature as the circulating liquid. If the gas is outside air it may happen in humid climates that the dew point of the air is not sufficiently low. In such a case, means may be provided for drying the incoming air in order to lower its dew point.

In the arrangement illustrated in Fig. 3 a heat insulated water tank 20 is provided, which is partitioned to form a container 21 in the tank 20 for receiving the food stuff or the like to be cooled. The container 21 is accessible from outside the tank 20 by means of a heat insulated door similar to door 3 illustrated in Fig. 2. Except for the door the walls of the container 21 are made of a material of high heat conductivity. The tank 20 is arranged to form the lower part of a casing 22 which near its upper part is provided with a partition wall 23 to form two chambers 24 and 25 in the casing 22, one on top of the other. The lower chamber 25 communicates with the interior of the tank 20 and is provided with a plurality of tubes 26 the walls of which are made of a material of high heat conductivity. The tubes 26 extend from a region somewhat above the water level, when the tank 20 is filled with water, to the partition wall 23 and open through the partition wall 23 into the upper chamber 24. The upper chamber 24 is provided with an outlet 27 communicating with the outside air by a suitable conduit 28. In the upper chamber 24, a plurality of water jets 30 are provided each opposite the open upper end of a tube 26. The jets 30 are fed with water derived from the water in the tank 20 by means of a water pump 31 and a suitable pipe line 32 leading from the tank 20 to the pump 31 and thence to the jets 30. The lower chamber 25 is provided with an inlet 33, which preferably is arranged just below the partition wall 23. The inlet communicates with the delivery side of a fan or the like 34 for injecting outside air into the lower chamber 25.

In operation, the fan or the like 34 delivers outside air into the interior of the lower chamber 25. The air descends in the lower chamber outside the tubes 26 and subsequently ascends through the interior of the tubes 26, reaches the upper chamber 24, and leaves the upper chamber through its outlet 27 and conduit 28. Simultaneously, the water pump 31 delivers water to the jets 30, the water being sprayed from each jet into one of the tubes 26, descends in the interior of the tubes 26 and flows from the open lower end of the tubes 26 back into the tank 20. It will be recognised that within the tubes 26 the descending water flows in counterflow to the ascending air current. The descending water evaporates in part into the ascending air current, thereby cooling the air current as well as the remaining portion of the descending water so that cooled water flows from the lower ends of the tubes 26 into the tank 20 and cools the water therein, and thereby the container 21 with its food stuff or the like. It will also be recognized that the air within the tubes 26 flows in counter-flow to the incoming air outside the tubes 26 delivered from the fan or the like 34 to the lower chamber 25. Since the walls of the tubes 26 are made of a material of high heat conductivity, the air inside the tubes 26 which has been cooled by the evaporation of the water pre-cools, by heat exchange through the walls of the tubes 26, the incoming comparatively warm and dry air outside the tubes 26, thereby lowering its wet bulb temperature to approximately its dew point and, thus, increasing the cooling effect of the arrangement.

In the arrangement shown in Fig. 4 a tank 40 for water comprises a container 41 for the foodstuff or the like to be cooled. The tank 40 forms the lower part of a casing 42 provided with an outlet duct 43, jets 44 supplied with water from the tank 40 by means of a pump 45 and pipe 46. A fan or the like 47 injects outside air through a coiled or the like tube 50 provided in the tank 40 into the casing 42, the air current so created leaving the casing 42 through the conduit 43. The wall of the tube 50 is made of a material of high heat conductivity. The air current in the casing 42 is cooled by evaporation of part of the water sprayed into the casing 42 from the jets 44. Thereby the remaining water is likewise cooled in the casing 42, returns to the tank and cools the water therein and thereby the contents of the container 41. The comparatively warm air injected from the outside by the fan or the like 47 into the tube 50 provided in the tank is pre-cooled by the water before the air reaches the casing 42 whereby the wet bulb temperature of the air is lowered to approximately its dew point and the cooling effect of the arrangement is increased.

In humid climates, only a small amount of water will evaporate into the air, so that the cooling effect of the arrangement will be low. In order to overcome this drawback, the outside air may be dried before it is injected into the casing. Such an arrangement is illustrated in Fig. 5 which is similar to that illustrated in Fig. 3, the only difference being that the air leaving the fan or the like 34 passes through a drying chamber 60 of any known and suitable construction before it is injected into the lower chamber 25.

It should be clearly understood that the drawings are given by way of example only and that many modifications, omissions, and additions are possible without departing from the spirit of this invention.

What is claimed is:

1. Means for cooling food stuff comprising a tank for an evaporative liquid, a container in the tank for receiving the food stuff to be cooled, the walls of said container being, at least in part, made of a material of high heat conductivity, means for creating a current of a gaseous medium, and means for circulating liquid from said tank through the gas current in counterflow thereto and in direct contact therewith back to the tank, the arrangement being such that, in operation, the said container is submerged in the evaporative liquid in said tank, and the circulating liquid while in contact with the gas current is cooled by evaporation and cools, on its return into the said tank, the liquid therein, whereby the contents of the said container are cooled.

2. Means for cooling food stuff comprising a tank for an evaporative liquid fluid, a container in the tank for receiving the food stuff to be cooled, the walls of said container being, at least in part, made of a material of high heat conductivity, means for creating a current of a gaseous fluid, means for circulating liquid from said tank through the gas current in direct contact therewith back to the tank, and means for pre-cooling the gas current before it comes into contact with the circulating liquid by heat exchange with one of said fluids, the arrangement being such that, in operation, the liquid in said tank surrounds, at least partly, the said container, and the circulating liquid while in contact with the gas current, is cooled by evaporation and cools, on its return into the said tank, the liquid therein, whereby the contents of the said container are cooled.

3. Means for cooling food stuff comprising a tank for an evaporative liquid, a container in the tank for receiving the food stuff to be cooled, the walls of said container being, at least in part, made of a material of high heat conductivity, means for creating a current of a gaseous medium, means for circulating liquid from said tank through the gas current in direct contact therewith back to the tank, and means for pre-cooling the gas current by heat exchange with the liquid in said tank before it comes into contact with the circulating liquid, the arrangement being such that, in operation, the liquid in said tank surrounds, at least partly, the said container, and the circulating liquid while in contact with the gas current, is cooled by evaporation and cools, on its return into the said tank, the liquid therein, whereby the contents of the said container are cooled.

4. Means for cooling food stuff comprising a tank for an evaporative liquid, a container in the tank for receiving the food stuff to be cooled, the walls of said container being, at least in part, made of a material of high heat conductivity, means for creating a current of a gaseous medium, means for circulating liquid from said tank through the gas current in direct contact therewith back to the tank, and means for pre-cooling a part of the gas current, before it comes into contact with the circulating liquid, by heat exchange with another part of the gas current in contact with the circulating liquid, the arrangement being such that, in operation, the liquid in said tank surrounds, at least partly, the said container, and the circulating liquid while in contact with the gas current, is cooled by evaporation and cools on its return into the said tank, the liquid therein, whereby the contents of the said container are cooled.

5. Means for cooling food stuff comprising a tank for an evaporative liquid, a container in the tank for receiving the food stuff to be cooled, the walls of said container being, at least in part, made of a material of high heat conductivity, means for creating a current of a gaseous medium, means for circulating liquid from said tank through the gas current in direct contact therewith back to the tank, and means for drying the gas current before it comes into contact with the circulating liquid, the arrangement being such that, in operation, the liquid in said tank surrounds, at least partly, the said container, the circulating liquid while in contact with the gas current, is cooled by evaporation and cools, on its return into the said tank, the liquid therein, whereby the contents of the said container are cooled.

6. Means for cooling food-stuff comprising a casing, a tank for an evaporative liquid, said tank being arranged to form the lower part of said casing, a container in said tank for receiving the food stuff to be cooled, the walls of said container being, at least in part, made of a material of high heat conductivity, a plurality of tubes in said casing, the walls of said tubes being made of a material of high heat conductivity, means for creating a stream of air composed of an air current in said casing outside said tubes, and an air current inside said tubes, and means for circulating liquid from said tank through one of the air currents in direct contact therewith back to the tank to cause part of the circulating liquid to evaporate into the one air current and thereby to cool the remainder of the circulating liquid and the one air current by evaporation, and to pre-cool the other air current by heat exchange through the walls of the said tubes, the one air current being in tandem to the other air current, the remainder of the circulating liquid when fed back to the said tank cooling the liquid and thereby the said container therein.

7. Means for cooling food stuff comprising a casing, a tank for an evaporative liquid, said tank being arranged to form the lower part of said casing, a container in said tank for receiving the food stuff to be cooled, the walls of said container being, at least in part, made of a material of high heat conductivity, a plurality of tubes in said casing, the walls of said tubes being made of a material of high heat conductivity, an inlet in said casing, means for injecting outside air into said casing through its inlet to create a first air current in said casing outside said tubes, means for deflecting the air to flow in a second air current through said tubes, an outlet communicating with the interior of said tubes for discharging the second air current, and means for circulating liquid from said tank through the interior of said tubes in direct contact with the second air current back to the tank to cause part of the circulating liquid to evaporate into the second air current and thereby to cool the remainder of the circulating liquid and the second air current by evaporation and to pre-cool the first air current by heat exchange through the walls of the said tubes, the circulating liquid when fed back to the said tank cooling the liquid and thereby the said container therein.

8. Means as claimed in claim 7 and comprising means for drying the air before it is injected into said casing.

ELLY BERLOWITZ,
*Administratrix of the Estate of Max Berlowitz, Deceased.*

REFERENCES CITED

The following references are of record in the file of this patent:

UNITED STATES PATENTS

| Number | Name | Date |
| --- | --- | --- |
| 927,571 | Merralls | July 13, 1909 |
| 1,427,981 | Swartwood | Sept. 5, 1922 |
| 1,472,051 | Davis | Oct. 30, 1923 |

FOREIGN PATENTS

| Number | Country | Date |
| --- | --- | --- |
| 148,763 | Germany | Mar. 10, 1903 |